United States Patent [19]

Brown

[11] Patent Number: 5,105,612
[45] Date of Patent: Apr. 21, 1992

[54] WELD REINFORCING MEMBER FOR STRANDS IN A CABLE

[75] Inventor: Charles J. Brown, Harlow, United Kingdom

[73] Assignee: STC PLC, London, England

[21] Appl. No.: 616,860

[22] Filed: Nov. 21, 1990

[30] Foreign Application Priority Data

Dec. 1, 1989 [GB] United Kingdom ............... 8927270

[51] Int. Cl.⁵ ............................................. D02G 3/36
[52] U.S. Cl. ................................................. 57/213
[58] Field of Search ............... 57/212, 213, 214, 215, 57/216, 22, 23, 902; 403/270, 271

[56] References Cited

U.S. PATENT DOCUMENTS 1,481,934  1/1924  Sunderland ........................... 57/215
4,651,513  3/1987  Dambre ................................ 57/213 X

FOREIGN PATENT DOCUMENTS 271688   6/1927  United Kingdom.
297583  10/1927  United Kingdom.
880223   7/1959  United Kingdom.
1342359  8/1971  United Kingdom.
1435250  9/1974  United Kingdom.

Primary Examiner—Daniel P. Stodola
Assistant Examiner—John Rollins
Attorney, Agent, or Firm—Lee, Mann, Smith, McWilliams, Sweeney & Ohlson

[57] ABSTRACT

A stranded wire strength member (2, 3) has a cable locking element (4) lying in the interstice between adjacent wires of the strength member. The locking element is of mild steel and has a surface coating (4a) of carbide grit which locks the adjacent wires of the strength member together in the region of a welded joint, to improve the load sharing capacity of the wires of the strength member.

5 Claims, 1 Drawing Sheet

WELD REINFORCING MEMBER FOR STRANDS IN A CABLE

BACKGROUND OF THE INVENTION

This invention relates to stranded wire strength members particularly but not exclusively such strength members used in submarine telecommunications cables.

Tensile strength member wires are used in many applications from simple wire ropes to more complicated stranded strength member layers in submarine cables such as that shown somewhat schematically in FIG. 1 of the accompanying drawings. When a wire tensile strength member is laid up into a cable element or a strength member layer of a cable element, it is the normal practice when a wire supply bobbin becomes exhausted to weld the end of the wire from the bobbin onto the beginning of the wire of the next bobbin and to continue manufacture from the second bobbin.

Where welds between butted ends of wires occur in a stranded wire strength member, the strength of the individual wire at the weld is not as great as the wire itself. Where these weld joints are randomly spread throughout a cable element, then this may not be of any great consequence, but where a stranded wire strength member is created from a plurality of wires of similar length from individual bobbins, then these bobbins tend to become exhausted at substantially the same place along the length of the cable being made.

It is an object of the present invention to minimise if not eliminate any weakness of a welded joint creating a tensile weakness in the strength member so formed.

SUMMARY OF THE INVENTION

According to the present invention there is provided a wire tensile strength member comprising a plurality of wires assembled together and embracing each other and having interstices therebetween, at least one of the wires having a welded joint therein, and comprising a cable locking element arranged in the interstice between some of the wires and lying against the wire having the welded joint so that the locking element extends in both directions from the welded joint, said locking element comprising a roughened surface which thus locks the wire having the welded joint to at least one other adjacent wire over a longitudinal region extending on both sides of the welded joint.

Preferably the locking element comprises a cross-sectionally round mild-steel wire coated with carbide grit bonded thereto by solder or braze or other adhesive. This wire when sized correctly can then deform to take up any desired cross-section to grip welded wires.

BRIEF DESCRIPTION OF THE DRAWINGS

In order that the invention can be clearly understood reference will further be made to FIG. 1 of the drawings already referred to, and to FIGS. 2 and 3 which show details of FIG. 1, FIG. 2 showing an enlarged cross section of part (4) of FIG. 1, and FIG. 3 showing part of FIG. 1 enlarged for clarity.

DESCRIPTION OF THE PREFERRED EMBODIMENT

Figure 1:
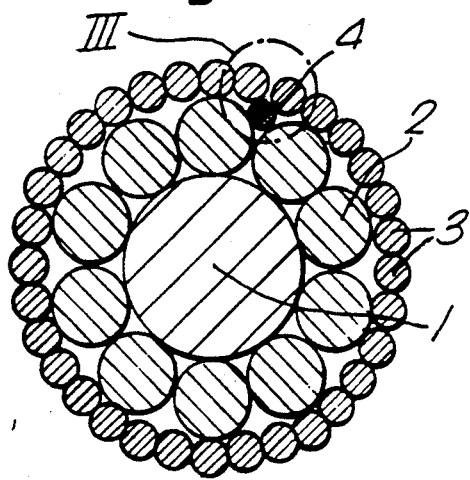

Referring to the drawing a submarine cable comprises an optical core 1 which includes several optical fibres within a pressure-resistant and preferably conductive tube, as described in our earlier British patent 1550588.

Surrounding the optical core is a layer of high tensile strength wires 2 which are stranded around the optical core 1.

Figure 2:
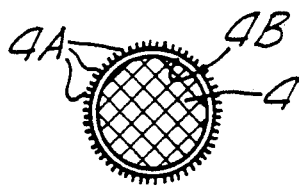

The single layer of wires 2 comprises the inner layer of a tensile strength member which includes also a second outer layer 3 of smaller diameter wires. For example the layer 2 comprises wires having a diameter of 2.64 mm whereas the second outer layer each have a diameter of 1.19 mm.

Where there is a weld in a wire of either the inner layer or the outer layer, then a cable locking element such as 4 shown in cross-section and on a larger scale in FIG. 2, is placed into the interstice between the inner and outer layers of wires. This wire has a diameter in this particular embodiment of 1.2 mm and is coated with carbide grit 4A having a sub- 125 um size bonded to the mild steel wire by a solder or braze 4B or by the use of other adhesive. A particularly suitable process is that used to make the "ABRAFILE" (registered trade mark) product in which we believe the metal surface is heated to about 1000° Centrigrade and wetted with cobalt prior to bonding the carbide grit particles to the mild-steel by wetted surfaces.

Figure 3:
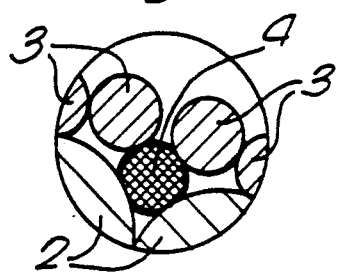

During manufacture the cable locking element 4 is inserted in between two adjacent inner strand wires 2 effectively acting as a filler wire. When the outer strand wires 3 are applied and the cable structure is drawn through a closing die, the cable locking element deforms and locks the inner and outer strand wires 2 and 3 together. A typical deformation of element 4 is shown in FIG. 3 which is a detail of the locking element 4 and the immediately adjacent wires 2, 3 locked to it, including the wire with the weld. Thus the function of the locking element is to lock the inner and outer strand wires together and this alters the load sharing capacity of the cable.

In the embodiment described the length of the cable locking element could be up to 12 meters long which means that 6 meters of cable will be gripped on either side of the welded region.

The arrangement described allows a more advantageous load sharing capacity to be utilised in those regions of cable where welds are found in the outer strand wires. However the invention is applicable as described above to welded inner strand wires. Significant increases in cable loads before wire failures are expected and it may be possible to achieve 90% of the cable Ultimate Tensile Stress.

We believe the cable locking element can be applied to lengths of cable without any major changes to the normal production line of the cable as there is adequate space between the strander which applies the inner layer 2 and the strander which applies the outer layer 3, to allow a small single wire to be inserted before the outer strand wires are applied to the cable. The filler wire would only be applied to lengths of cable where welds are required.

Although only one cable locking element is shown in the drawing, several such elements could be used and in fact we believe that one such element should be used for each welded wire in order to gain full advantage of the invention.

In the embodiment described there are thirty-two outer wires in the layer 3 and ten wires in the inner layer 2. The layers are wound in opposite directions to achieve a torque balance, although the invention is applicable to other wire sizes and configurations, not necessarily contra-wound.

During manufacture of the cable where wires are to be welded, the locking element can be soldered or taped in place to hold it until the outer layer is stranded and laid up.

The cable shown would be completed with an insulating sheath after the wires have been drawn down, and as described in the aforementioned patent.

The strength member wires in this embodiment are of high tensile steel, which is hard in relation to the mild steel of the cable locking element, but not as hard as the roughened surface of the cable element formed by the carbide grit. Therefore although the locking element becomes deformed when the strength member is drawn down, the carbide grit becomes partially embedded both in the material of the cable locking element and in the high tensile steel wires adjacent to it. The locking elements therefore tend to prevent relative movement between the wires, so ensuring that tensile load on the strength member is evenly distributed throughout the wires.

What is claimed is:

1. A wire tensile strength member comprising a plurality of wires assembled into at least two layers and having interstices therebetween, at least one of said wires being different from the other wires by having a welded joint therein, there being a cable locking element arranged in an interstice between the at least one wire and adjacent wires and lying against the at least one wire so that the locking element extends axially in both directions from the welded joint, along said wire, wherein said locking element comprises a roughened surface which thus locks the at least one wire to at least one other adjacent wire over the length of the locking element.

2. A member as claimed in claim 1, wherein the cable locking element comprises a mild steel wire having a surface layer of grit bonded thereto.

3. A member as claimed in claim 2, wherein the grit is carbide grit.

4. A member as claimed in claim 2, wherein the size of the grit is sub 125 um.

5. A cable comprising a stranded wire tensile strength member and wherein at least one of the wires of the strength member has a welded joint therein, and comprising also a cable locking element comprising a wire inserted in an interstice of the strength member and lying against the wire having the welded joint for a distance on both sides of the welded joint, said wire having a roughened surface whereby to lock the welded wire to at least one adjacent wire by means of the cable locking element.

* * * * *